US009579959B2

(12) United States Patent
Beshiri et al.

(10) Patent No.: US 9,579,959 B2
(45) Date of Patent: Feb. 28, 2017

(54) METHOD AND SYSTEM OF IMPROVED TARP TENSIONING

(71) Applicant: GLIDER SYSTEMS IP INC., Belle River (CA)

(72) Inventors: Ilir Beshiri, Windsor (CA); Johan Neufeld, Wheatley (CA)

(73) Assignee: Glider Systems IP Inc., Belle River (CA)

( * ) Notice: Subject to any disclaimer, the term of this patent is extended or adjusted under 35 U.S.C. 154(b) by 0 days.

(21) Appl. No.: 14/814,887

(22) Filed: Jul. 31, 2015

(65) Prior Publication Data

US 2017/0028828 A1    Feb. 2, 2017

(51) Int. Cl.
*B60P 7/04*    (2006.01)
*B60J 7/06*    (2006.01)

(52) U.S. Cl.
CPC ............ *B60J 7/06* (2013.01); *B60J 7/064* (2013.01); *B60P 7/04* (2013.01)

(58) Field of Classification Search
CPC .... B60P 7/02; B60P 7/04; B60P 7/135; B60P 7/14; B60J 7/06; B60J 7/061; B60J 7/062; B60J 7/064; B60J 7/065
USPC .......... 296/100.12, 100.14, 100.15, 104, 105
See application file for complete search history.

(56) References Cited

U.S. PATENT DOCUMENTS

| | | | | |
|---|---|---|---|---|
| 5,472,256 A | * | 12/1995 | Tucker | B60J 7/198 296/100.18 |
| 5,538,313 A | * | 7/1996 | Henning | B60J 7/065 296/100.12 |
| 6,511,117 B1 | * | 1/2003 | Henning | B60J 7/102 296/100.12 |
| 6,634,697 B1 | * | 10/2003 | Petelka | B60J 7/062 296/100.12 |
| 6,976,433 B1 | * | 12/2005 | Neumann | B61D 39/002 105/377.03 |
| 7,798,553 B2 | * | 9/2010 | Beshiri | B60J 7/104 296/100.12 |
| 2002/0093216 A1 | * | 7/2002 | Ananian | B60P 7/0815 296/100.12 |
| 2002/0135199 A1 | * | 9/2002 | Hanning | B60J 7/065 296/105 |
| 2002/0167193 A1 | * | 11/2002 | Fliege | B61D 39/002 296/105 |
| 2003/0067186 A1 | * | 4/2003 | Cramaro | B60J 7/065 296/105 |
| 2007/0035153 A1 | * | 2/2007 | Henning | B60J 7/102 296/105 |
| 2007/0080557 A1 | * | 4/2007 | Knepper | B60J 7/02 296/105 |
| 2011/0221233 A1 | * | 9/2011 | Damsi | B60J 5/02 296/186.1 |

FOREIGN PATENT DOCUMENTS

JP        55-79714       *  6/1980   ............... B60J 7/02

* cited by examiner

*Primary Examiner* — Gregory Blankenship
(74) *Attorney, Agent, or Firm* — McMillan LLP

(57) ABSTRACT

The present invention relates generally to a tarp systems, in particular, to improvements to various aspects of a tarp tensioning system. The tarp tensioning system has a plurality of frames, the frames having two or more bow members and a biasing mechanism coupled therebetween to maintain tension on the tarp.

9 Claims, 24 Drawing Sheets

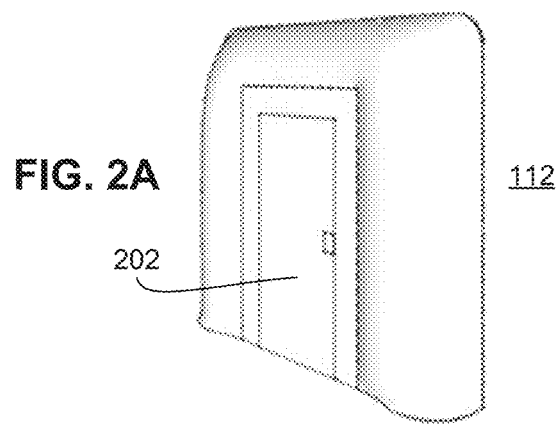
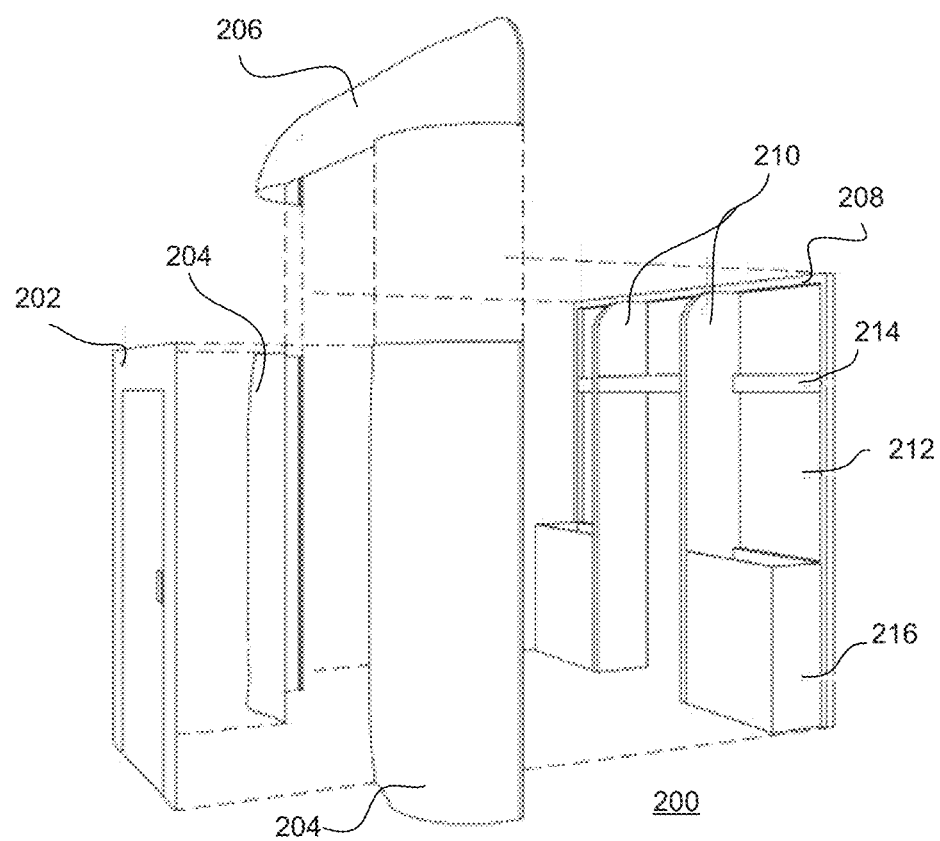

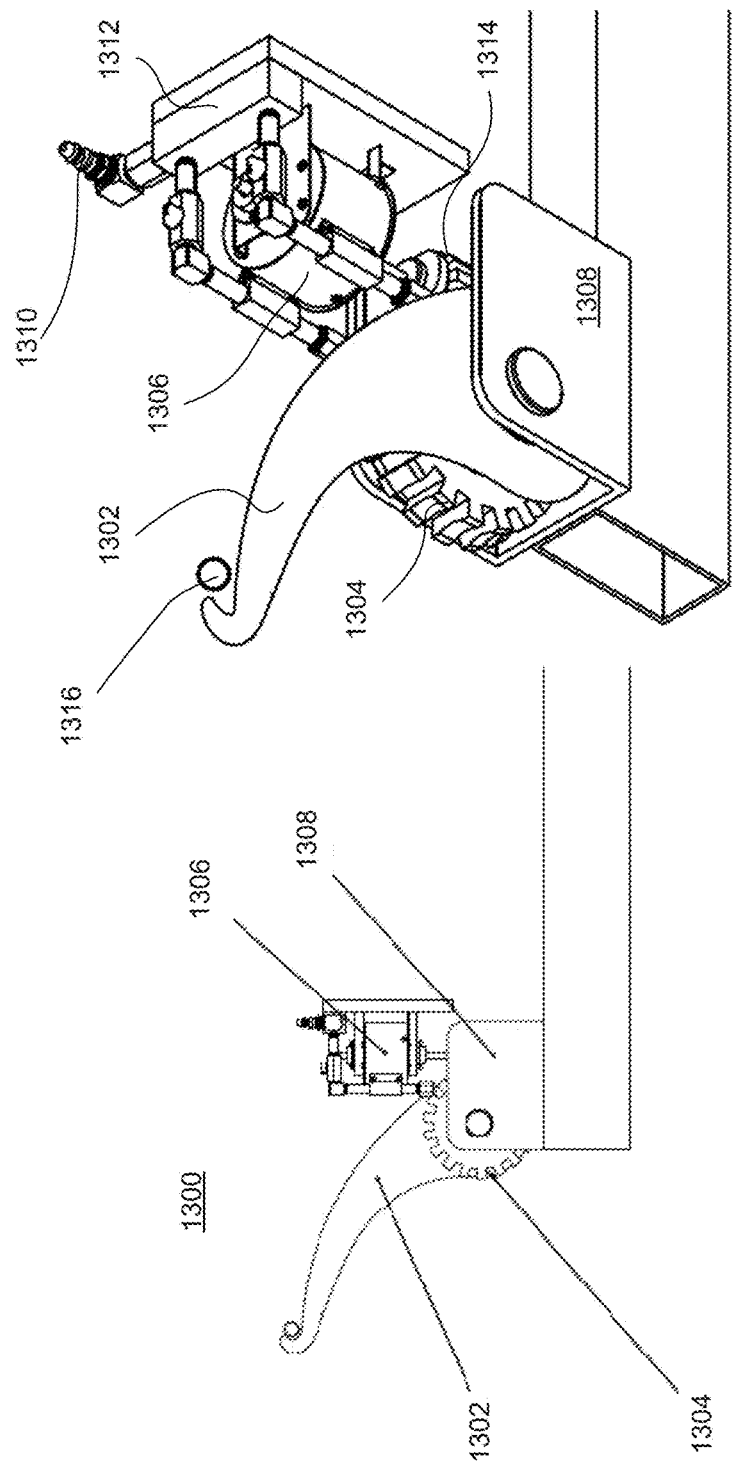

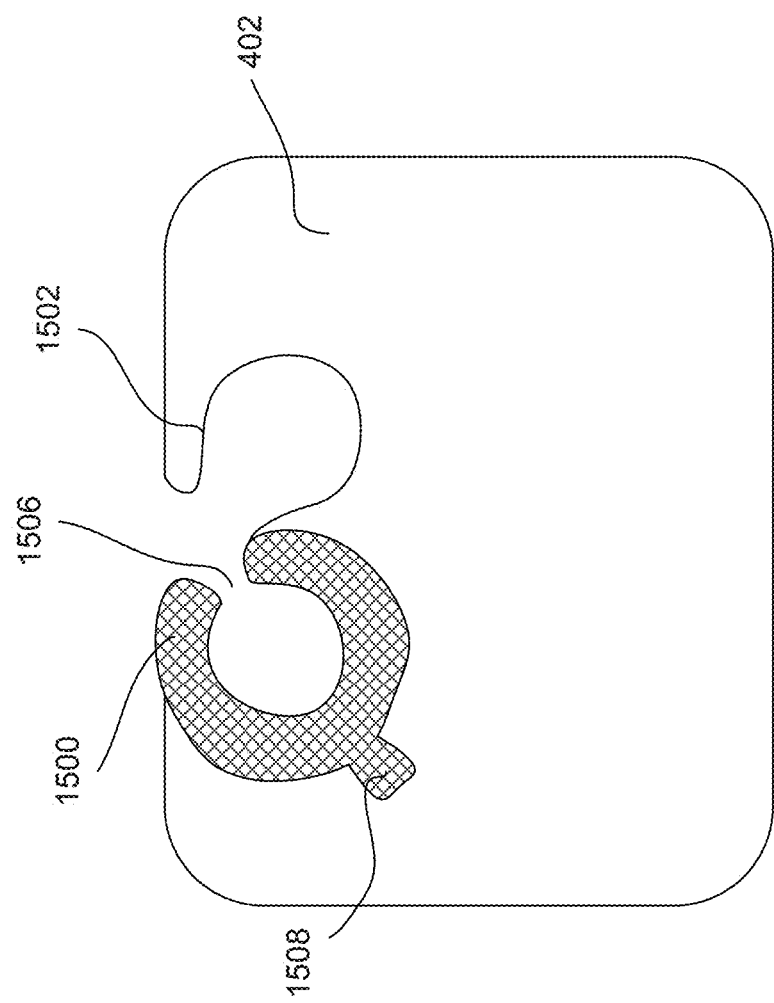
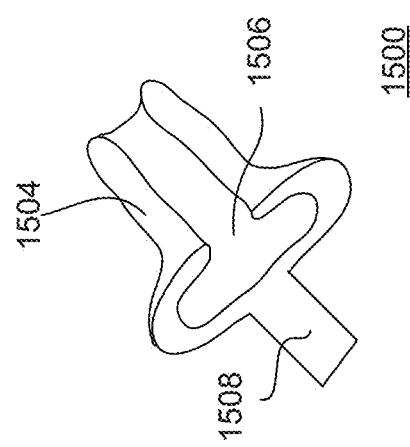

METHOD AND SYSTEM OF IMPROVED TARP TENSIONING

FIELD OF THE INVENTION

The present invention relates generally to the field of cover tarp systems, in particular, but not exclusively, for covering vehicle beds. In particular, the invention relates to improvements to various aspects of a tarp tensioning system.

BACKGROUND OF THE INVENTION

Aerodynamics and fuel efficiency is and has been a problem for the trucking industry for a considerable length of time. In a conventional tarp system, a drag factor exists whenever the tarp is not tensioned properly. Furthermore, the distance between the truck and the headboard of the tarp system also experiences drag. Prior designs in the industry have not had a particular focus on fuel efficiency in the design of the tarp system.

Tensioning of the tarp in the tarp system has also been a challenge for the industry. Various tensioners have been developed. Prior systems connect the tarp to a headboard and rely on the rigidity of the headboard to support tension that is adjusted from the rear of the trailer. This is a problem because the trailer may flex allowing slack in the tarp resulting in wrinkles in the tarp and consequently drag as the truck and trailer travel.

One such tarp tensioning device is described in U.S. Pat. No. 6,511,117 to Aero Industries, Inc., herein incorporated by reference. The automatic tarp tensioning device removes slack from a tarp cover by way of an extension mechanism attached to the tarp cover. An adjusting element is moveable relative to the extension mechanism to apply tension to the tarp cover. A biasing mechanism is disposed between the extension mechanism and the adjusting element to bias the adjusting element away from the extension mechanism to thereby tension the tarp cover. The biasing mechanism may be one or more springs in compression.

Another tarp tensioning system is described in U.S. Pat. No. 7,931,326 to Iles Professional Engineering Corporation, herein incorporated by reference. The system for connecting tarps to the vehicle has bows for supporting tarps, the bows comprising one or more tarp connectors, each of the connectors having a pair of channels for accepting a support pole. One or more corner connectors are adapted to receive an end of one of the tarp connectors. A plurality of tarps, each secured to the tarp connectors by wrapping the tarp around the support pole are inserted into the channel of the tarp connector. The bows are combined with the tarps to create an enclosed cargo area.

It is an object of this invention to at least provide a novel method and system for improved tarp tensioning.

SUMMARY OF THE INVENTION

According to one aspect of the invention, there is provided a system for tarping a trailer having a front and a back. A plurality of frames with at least two bow members are coupled together using a biasing mechanism. One or more wheels are mounted at a base of the frames and the wheels may be received into at least one track on either side of the trailer. The bow members are generally rectangular or square in shape and may have a plurality of ribs extending at an angle from at least one bow member. The angle of the ribs is approximately 30-degrees but may be of different angles. The ribs extend towards the front of the trailer; the ribs extend towards the back of the trailer; or both.

According to another aspect of the invention, there may be three bow members where the biasing mechanism is coupled between two of the bow members and cross members may interconnect the two bow members not coupled together with the biasing mechanism.

According to yet another aspect of the invention, the frame may have a post assembly with a generally L-shape coupled to the base of the frame. The wheels may be mounted to the post assembly. The post assembly may further have a tensioning element configure to hold a tarp to the frame.

According to any aspect of the invention, the biasing mechanism may be at least one of a shock absorber, a pneumatic, hydraulic, and air over hydraulic cylinder.

According to another aspect of the invention, a pair of channels, which are vertical with respect to the trailer, are coupled to each side of the frame. A pair of slide assemblies having a slide wheel at one end engages within the respective channel and a pair of connector blocks coupling the ends of the slide assembly opposite the slide wheel couple the slide assembly to the respective track of the trailer.

According to yet another aspect of the invention, there is provided a remotely actuated tensioning and release device coupled between the trailer and the frame located at a back of the trailer. The remotely actuated tensioning and release device comprises at least one of a pneumatic cylinder, a pneumatic barrel tensioner, gear assembly, a hydraulic cylinder, and any combination thereof and may be remotely actuated by a controller located proximate the front of the trailer.

According to another aspect of the invention, there is provided one or more hinges rotating the track horizontally with respect to the trailer so as to permit the tracks to widen the tarped area for oversized loads. An actuator rotating the at least one hinge. According to another aspect of the invention, the frame further has two frame portions coupled together with at least one frame expanding actuator to increase a horizontal distance between the two frame portions in order to permit the frame to expand or contract in width to match the widened space between the two tracks.

According to any of the aspects above, there is further provided an aerodynamic headboard located at a front of the trailer. The aerodynamic headboard may further have a door for access to an interior tarped area of the trailer. The aerodynamic headboard may have two side deflectors and a top deflector formed from either fiberglass, molded plastic, or a combination thereof. The side deflectors and top deflector may be coupled to a storage structure having vertical structural supports where the vertical structural supports may be further coupled to a backplane. At least one pneumatic cylinder may be coupled to the aerodynamic headboard and the trailer reducing angular motion of the aerodynamic headboard thereby maintaining tension on the tarp.

BRIEF DESCRIPTION OF THE DRAWINGS

An embodiment will now be described, by way of example only, with reference to the attached Figures, wherein:

FIGS. 2A and 2B show a perspective view and an exploded view of a headboard of the tarp tensioning system;

FIGS. 13A and 13B show a side plan view and a perspective view of gear assembly for tensioning a tarp;

FIGS. 15A and 15B show a perspective view of an end cap and the end cap in position respectively;

DETAILED DESCRIPTION OF THE EMBODIMENT

While the Background of Invention described above has identified particular problems known in the prior art, the present invention provides, in part, a new and useful application for tarp tensioning.

Figure 1A:
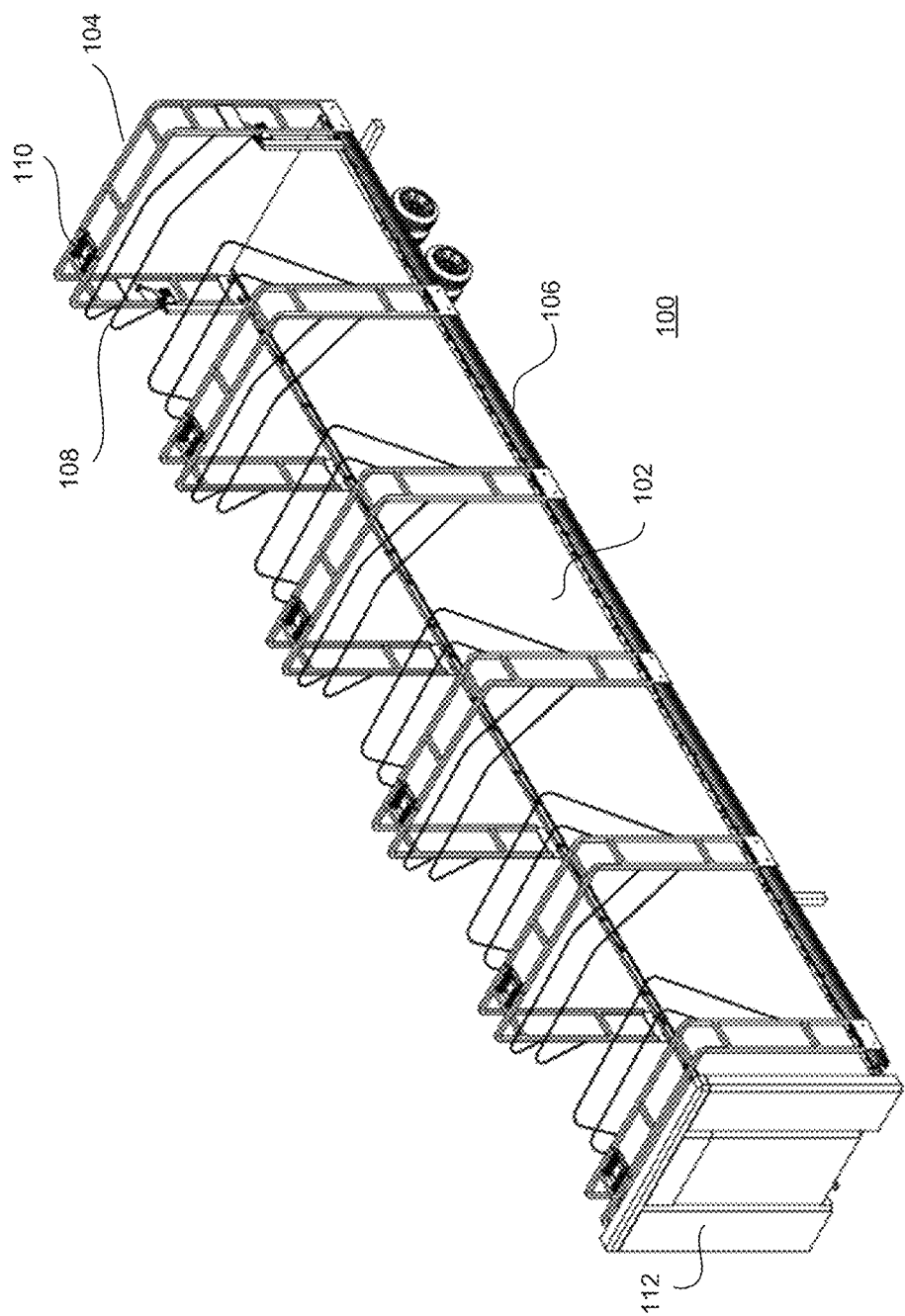
FIG. 1A shows a top perspective view of a flat bed trailer with a tarp tensioning system.

FIG. 1A shows a tarp tensioning system 100 for covering a flatbed trailer 102. The tarp tensioning system 100 has a plurality of frames 104 placed in tracks 106 on either side of the flatbed trailer 102. The frame 104 is approximately rectangular or square in shape forming sides and a top with sufficient clearance over the load on the trailer 102. Each of the frames 104 has a plurality of ribs 108 extending at an angle from the frame 104 backward in the case of the frame 104 at the front of the flatbed trailer 102; forward in the case of the frame 104 at the back end of the trailer 102; or in both directions in the case of the frame 104 in the middle of the trailer 102. The ribs 108 provide additional support and tension to the tarp strung between two frames 104. One or more of the frames 104 may have a biasing mechanism 110 capable of expanding the frame 104 as further described below. The tarp tensioning system 100 also may have an aerodynamic headboard 112.

Figure 1B:
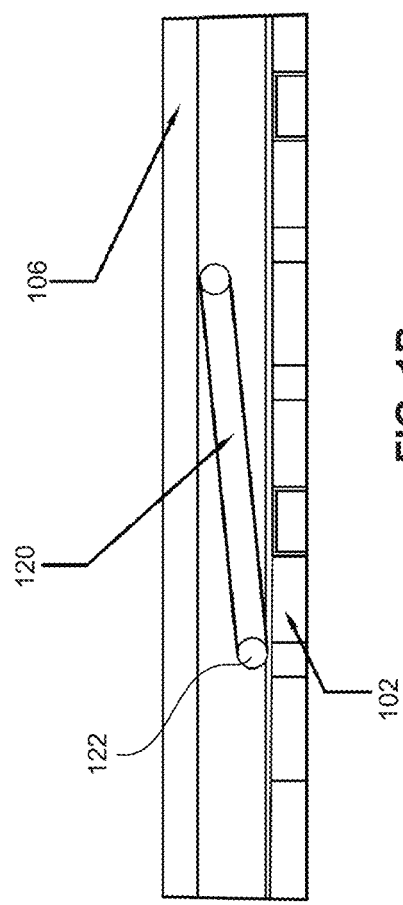
FIG. 1B shows a top view of a track expanding mechanism for the tarp tensioning system.

As shown in FIG. 1B, the track 106 of the tarp tensioning system 100 may be coupled to the trailer 102 by one or more hinges 120 that swivels using two rotational couplers 122. The hinges 120 rotate the track 102 horizontally away from the trailer 102. Although only one hinge 120 is shown in FIG. 1B, the inventor contemplates that many hinges may be used in order to securely couple the track 106 to the trailer 102. The rotational couplers 122 may be rotated by way of electric motors, pneumatically, or hydraulically (not shown). Alternatively, the hinge 120 may comprise a pneumatic or hydraulic cylinder. By permitting the track 106 to rotate away from the trailer 102, wider loads may be permitted on the trailer while also permitting tarping of the load.

Figure 1C:
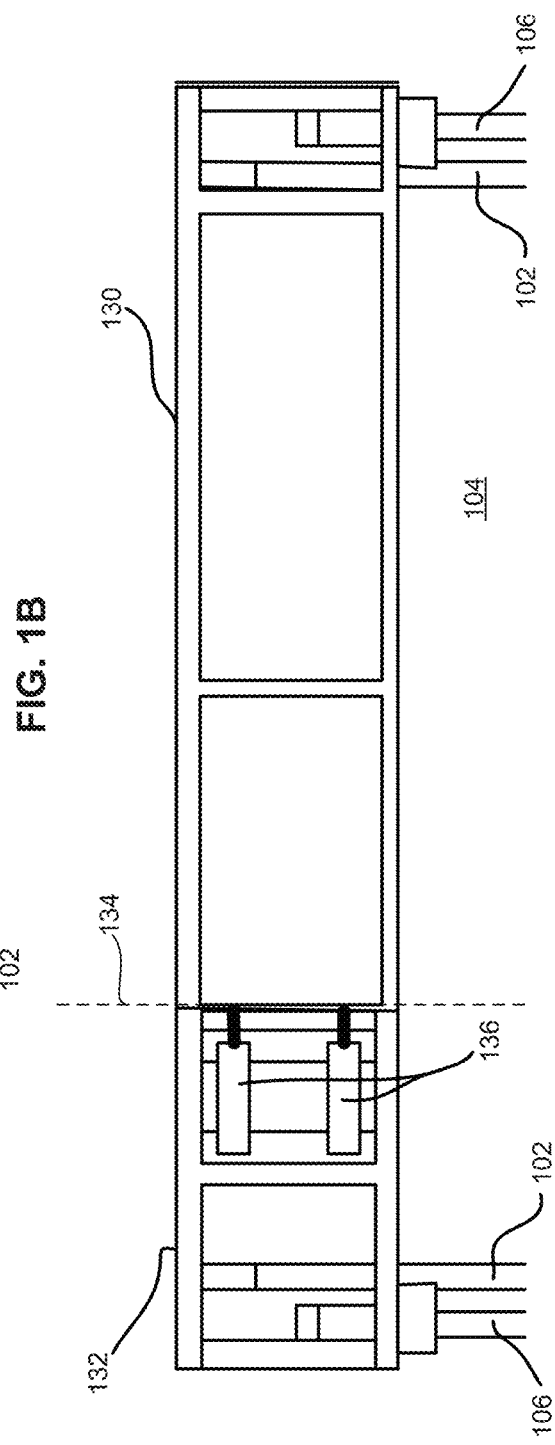
FIG. 1C shows a top view of a expanding frame for the tarp tensioning system.

The frame 104, as shown in FIG. 1C, comprises two frame portions 130 and 132 (more clearly shown as divided by line 134) coupled together with one or more frame expanding actuators 136 such as the two pneumatic cylinders or other form of coupling mechanism such as dampers, hydraulic cylinders, or the like. One end of the frame expanding actuator 136 is coupled to one frame portion 130 and the other end of the frame expanding actuator 136 is coupled to the other frame portion 132. As the tracks 106 move away from the trailer 102 by way of the hinges 120, the pneumatic cylinders 136 expand the frame 104 by a similar distance between the two frame portions 130 and 132 maintaining the wheels of the frame 104 within the tracks 106. The frame 104 is thus expanded so the tarped area grows with the wide load. Although FIG. 1C shows the two frame portions 130 and 132 being asymmetrical, the inventor contemplates that the two frame portions 130 and 132 may be of equal length.

The aerodynamic headboard 112 is shown in more detail with respect to FIGS. 2A and 2B where FIG. 2B shows an exploded version 200 of the headboard 112. The headboard 112 has a door 202 to enable access to the interior tarped area of the trailer 102. The door 202 is connected to the headboard 112 by hinges and has a conventional door handle and may have a lock. The headboard 112 has a plurality of shaped fiberglass (molded plastic or other composites) wind deflectors such as two side deflectors 204 and a top deflector 206. The deflectors 204 and 206 are shaped and formed in order to improve aerodynamics and thereby save fuel by reducing drag. Alternatively, the deflector 204 may comprise a single piece of material.

The deflectors 204 and 206 are coupled to a storage structure 208 having vertical structural supports 210 that provide increased structural stability for the deflectors 204 and 206. The structural supports 210 are connected to a backplane 212 that extends the height of the anticipated load placed on the trailer 102. The backplane 212 may also have horizontal cross members 214 providing additional horizontal support. The bottom of the storage structure may have a plurality of storage areas 216 accessible from inside the tarped area. These storage areas 216 also provide structural support for the deflectors 204. The entire structure is designed to be able to withstand significant wind and crosswinds encountered during road or train travel.

Figure 3A:
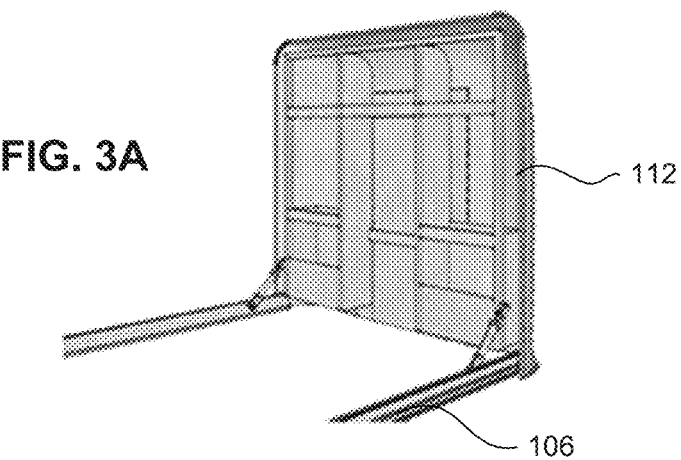
FIGS. 3A and 3B show a perspective view and an exploded view of a tensioning device for the headboard of the tarp tensioning system.
Figure 3B:
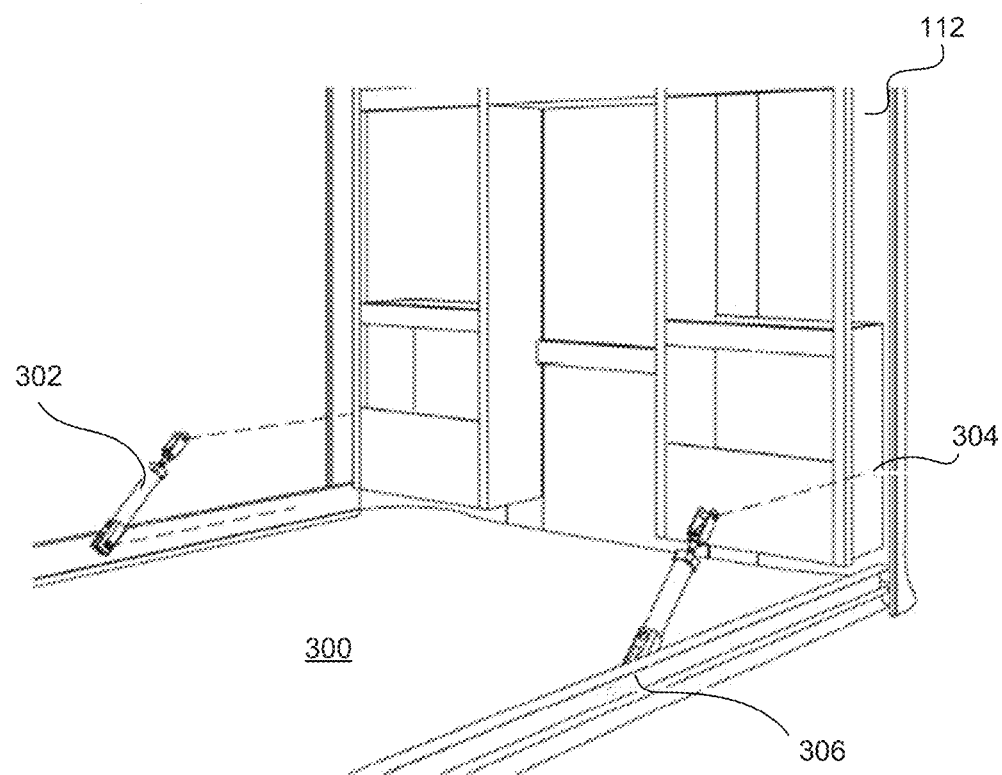

The headboard 112 is coupled to the end of the tracks 106 as shown in FIGS. 3A and 3B. When travelling, the trailer 102 flexes resulting in the headboard 112 angling towards the back of the trailer 102. The result is slack in the tarp on the top which eventually results in a wrinkle causing drag. One or more pneumatic cylinders 302 is mounted at one end 306 to the trailer 102 either to the track 106 or directly to the bed of the trailer 102. The pneumatic cylinders 302 are mounted at the other end 304 to the headboard 112. The pneumatic cylinders 302 push upward at an angle between 0 to 45 degrees on the headboard 112 thereby removing the slack in the tarp.

Figure 4A:
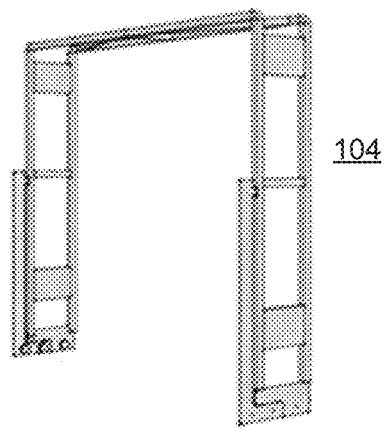
FIGS. 4A and 4B demonstrate a perspective view and an exploded view of a frame with a tensioning device.
Figure 4B:
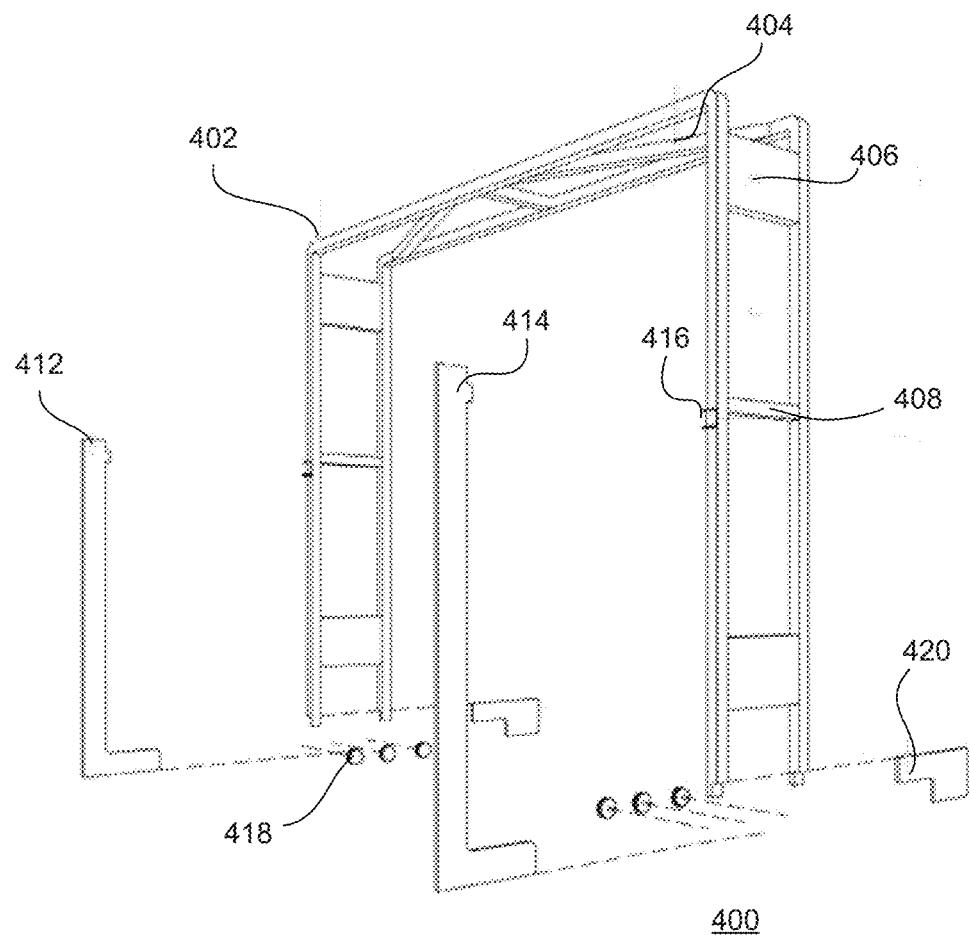

FIGS. 4A and 4B demonstrate an example of a frame 104 capable of tensioning the tarp. An exploded view 400 is presented in FIG. 4B. The frame 104 has a pair of rigid bow members 402 interconnected by a plurality of cross members 404, 406, and 408. The cross members may be diagonal 404, thick 406, or thin 408 depending on the strength necessary for the frame 104. A post assembly 412 having a generally L-shape is coupled to the base of the frame 104. The post assembly 412 has a male tensioning element 414 located at the top which engages a corresponding female tensioning element 416 that holds the tarp in position. A set of wheels on each side of the base of the post assembly 412 are held in place by a retention plate 420. The post assembly 412 is also held to the rigid bow members 402 by the retention plates 420. The wheels 418 permit the frame 104 to roll along the tracks 106 on either side of the trailer 102. In some examples, there are three wheels per side of the frame 104, in other examples, there are two wheels per side of the frame 104.

Figure 5A:
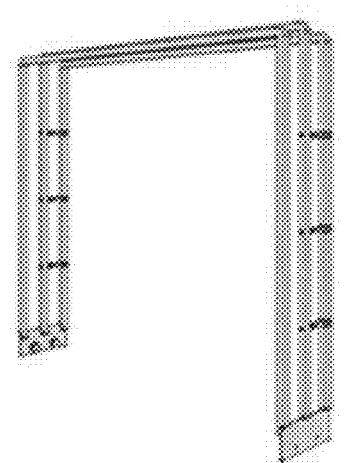
FIGS. 5A and 5B show a perspective view and an exploded view of another frame with a tensioning device.
Figure 5B:
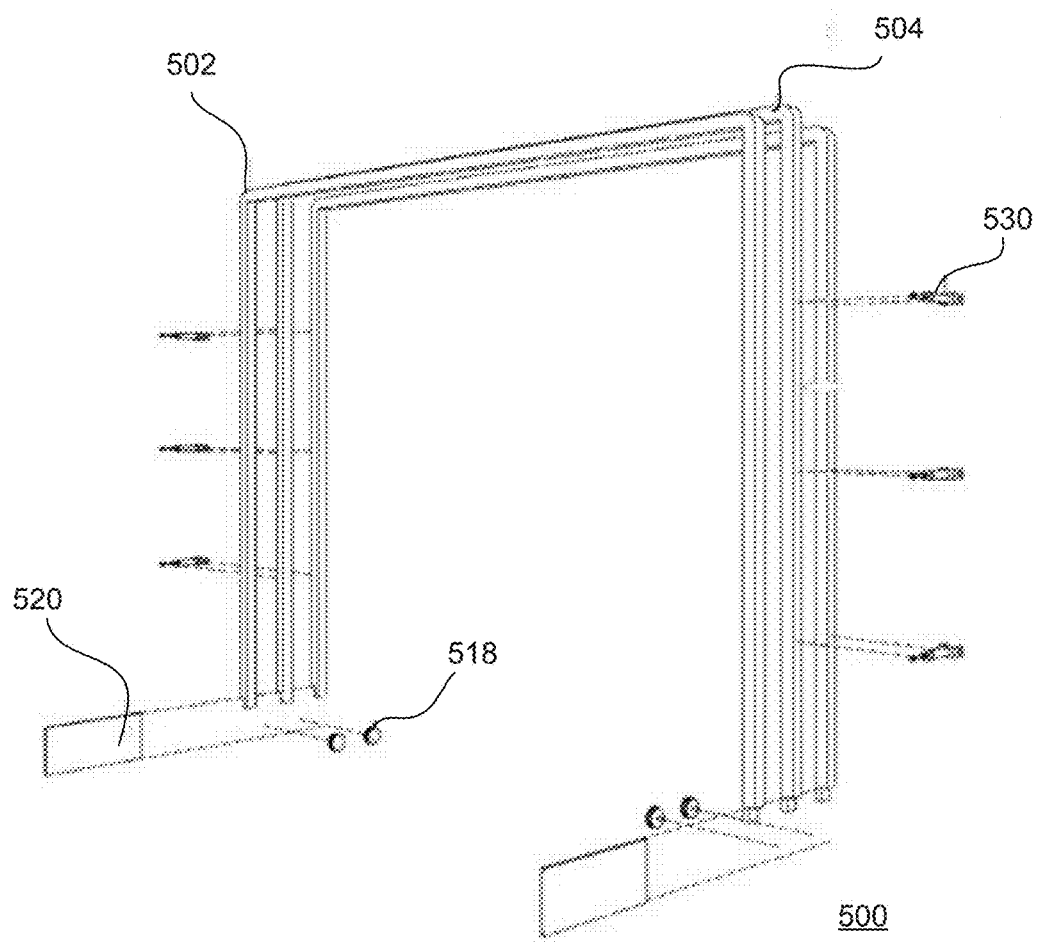

FIGS. 5A and 5B demonstrate another example of a frame 104 capable of tensioning the tarp. An exploded view 500 is presented in FIG. 5B. The frame 104 has a travelling bow member 504 between a pair of rigid bow members 502. The tarp is coupled to the travelling bow member 504. One or more biasing mechanisms 110 such as a pneumatic, hydraulic, or air over hydraulic cylinders 530 are mounted at one end on one of the rigid bow members 502. The other end of the cylinder 530 is mounted to the dynamic travelling bow member 504. The cylinders act as shock absorbers taking the slack of the tarp out while the trailer 102 is travelling. The rigid bow members 502 are connected to two plates 520. The travelling bow member 504 is swivelably coupled to the plate 520. At least one of the bow members 502 and 504 has a wheel 518 coupled between the plate 520 the respective bow member 502 and 504.

Figure 6A:
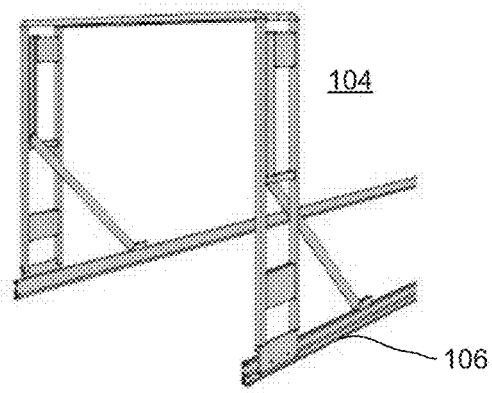
FIGS. 6A and 6B show a perspective view and an exploded view of yet another frame with a tensioning device.
Figure 6B:
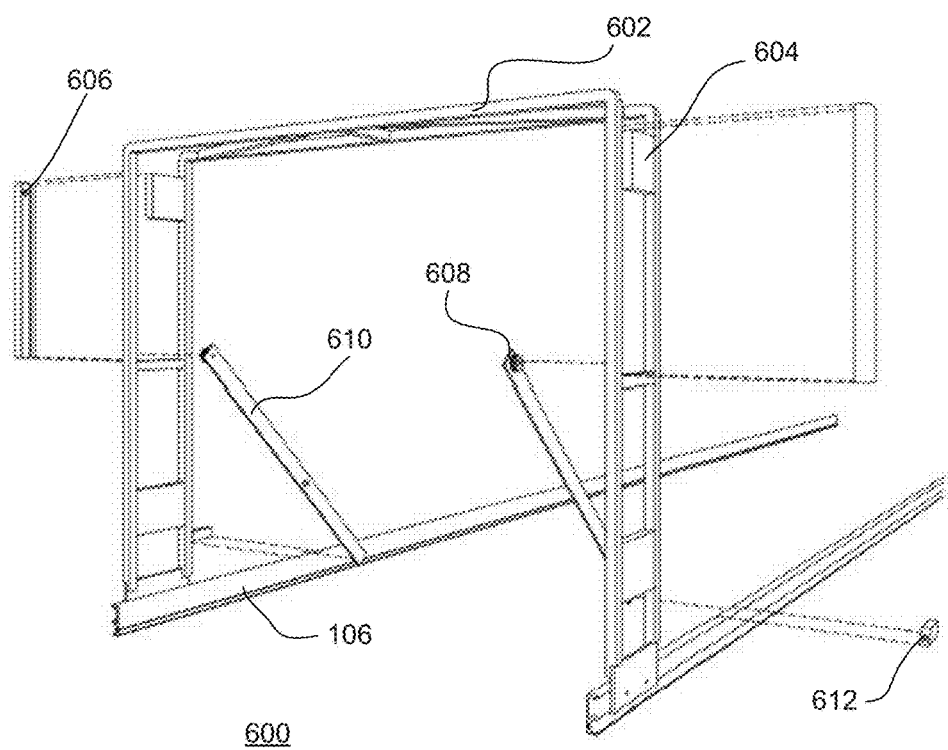

FIGS. 6A and 6B show yet another example of a frame 104 capable of tensioning the tarp. A frame 104 is similar to the one as previously described with reference to FIGS. 4A and 4B. A pair of rigid bow members 602 connected by cross members 604. A channel 606 is coupled to each side of the rigid bow members 602 where the channel 606 is in a vertical direction. A pair of slide assemblies 608, 610 is connected to the trailer 102 by a connector block 612 at one end. The connector block 612 is fixed to the top of the track 106 and accepts the thrust from the bar 610. The slide assemblies 608, 610 have a wheel 606 at the other end where the wheel is engaged within the channel 604. By sliding the connector 612 towards the frame 104, the tarp is tensioned and by sliding the connector 612 away from the frame 104, the tarp is released. When the trailer 102 flexes, the wheel 608 rises in the channel 606 resulting in the frame 104 maintaining a vertical orientation. This vertical orientation reduces the slack in the tarp.

Figure 7A:
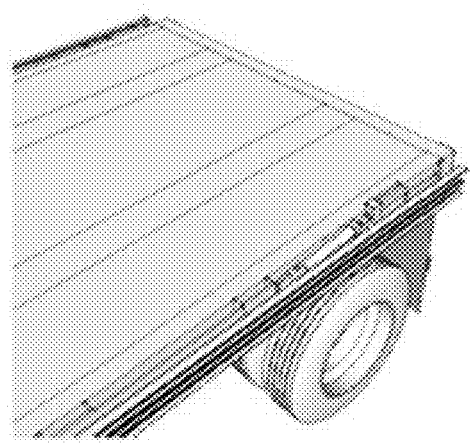
FIGS. 7A and 7B show a perspective view and an exploded view of a tensioning device for remote tensioning.
Figure 7B:
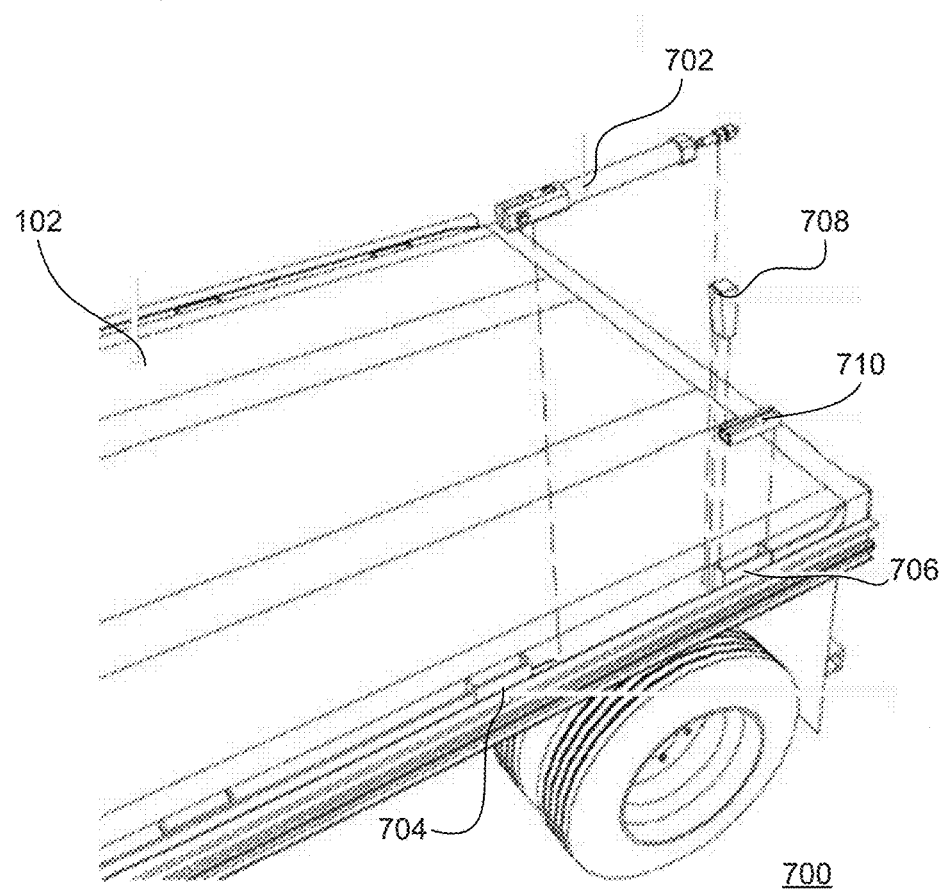

FIGS. 7A and 7B demonstrate a remotely actuated tensioning and release device. A button controller (now shown) located on or near the headboard 112 and is connected (either pneumatically or electronically) to a pneumatically (or hydraulically) actuated cylinder 702 mounted between two stake pockets 704 and 706. The cylinder 702 is fixed to the trailer 102 and the other end mounted to a wedged block 708 that is connected to the frame. The actuation of the cylinder 702 causes the wedged block 708 slide along a channel 710. This causes the frame 104 to move backward or forward resulting in releasing or tensioning of the tarp.

Figure 8A:
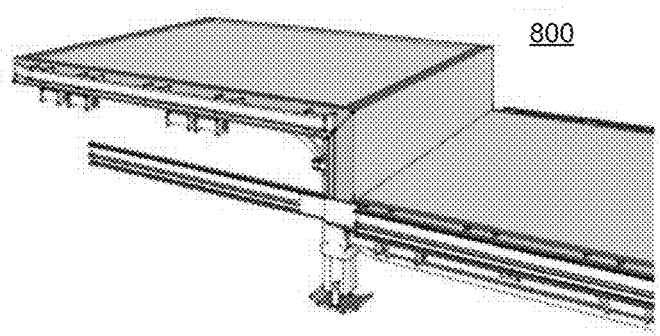
FIGS. 8A and 8B show a perspective view and an exploded view of a drop deck.
Figure 8B:
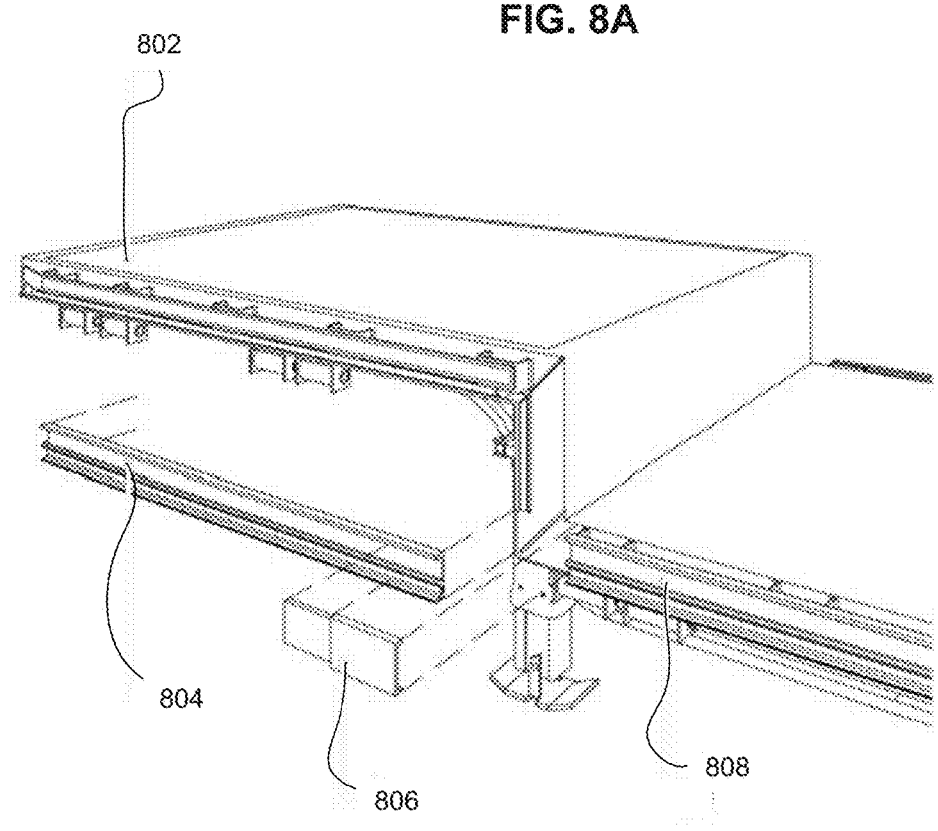

FIGS. 8A and 8B show a drop deck 800 for a trailer 102 where the upper deck frame 802 rolls onto the rear deck 808 and vice versa. The lower deck track 804 may be added by way of a flange 806 and may be added, removed, or moved mechanically, pneumatically, or by other means of power and stored when not in use. The lower deck track 804 is added when the rolling the frame forward of the upper deck is necessary.

Figure 9A:
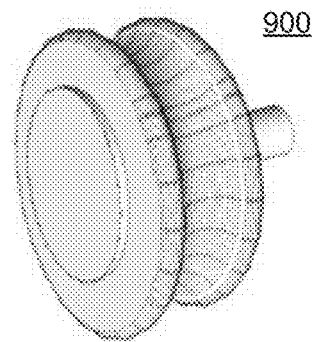
FIGS. 9A and 9B show a perspective view and plan views of a wheel for use in the tarp tensioning system.
Figure 9B:
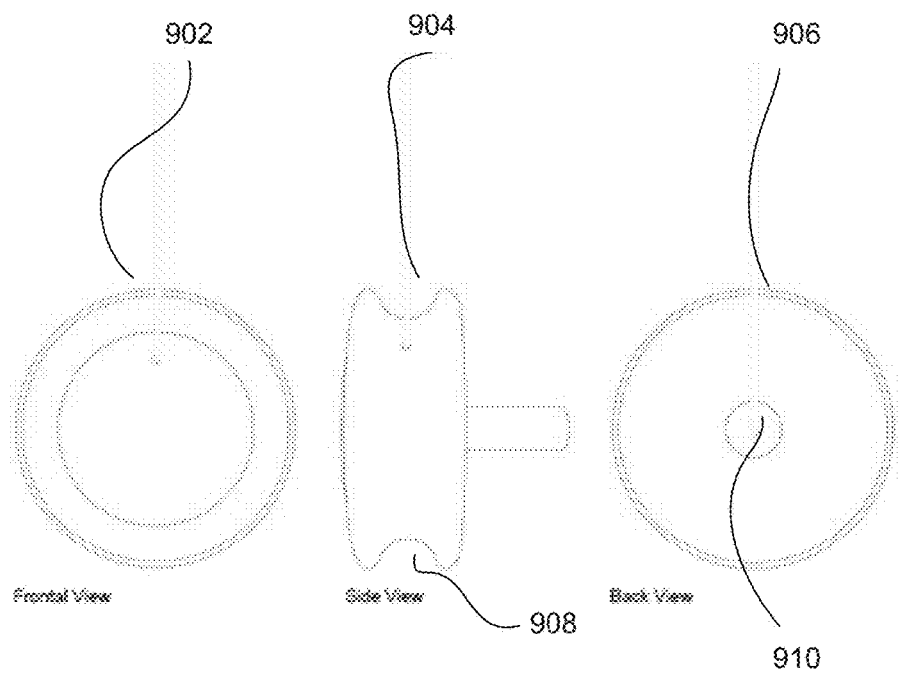
Figure 10A:
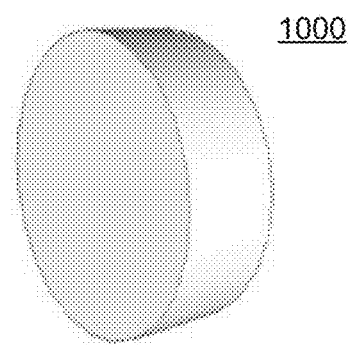
FIGS. 10A and 10B show a perspective view and plan views of a cover for the wheel of FIGS. 9A and 9B.
Figure 10B:
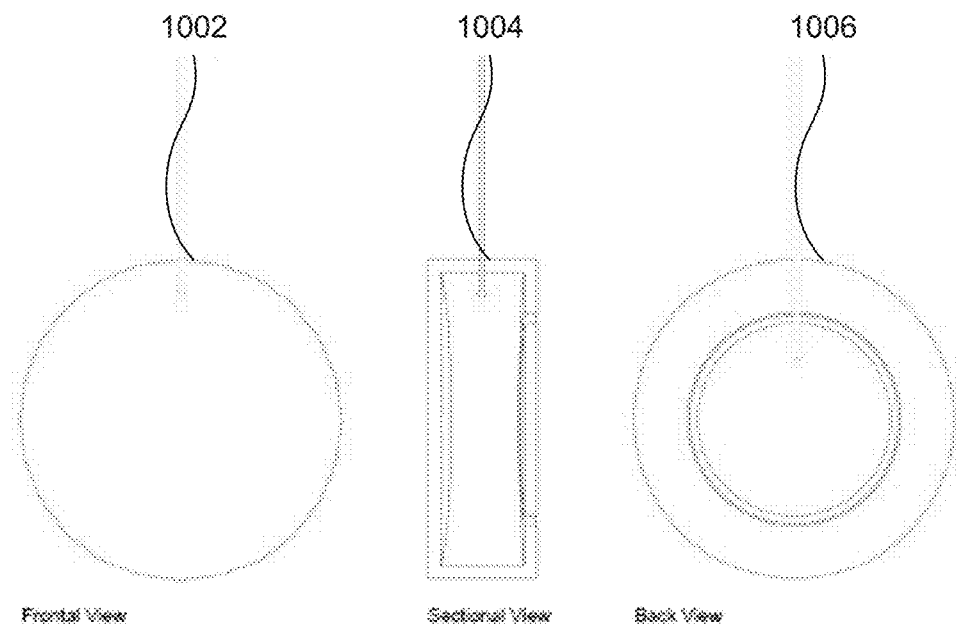

FIGS. 9A, 9B and 10A, 10B demonstrate a example wheel covering system to prevent atmospheric factors from impacting the performance of the wheel located at the base of the frame 104 as shown as element 418 and 518 in FIGS. 4B and 5B. A wheel 900 is shown in FIGS. 9A and 9B having a front 902, side 904, and back 906 views. The wheel 900 has a groove 908 to accept a corresponding protrusion within the track and a shaft 910. A cover 1000 is shown in FIGS. 10A and 10B having a front 1002, side 1004, and back 1006 views. The cover 1000 is placed over the wheel 900.

Figure 11:
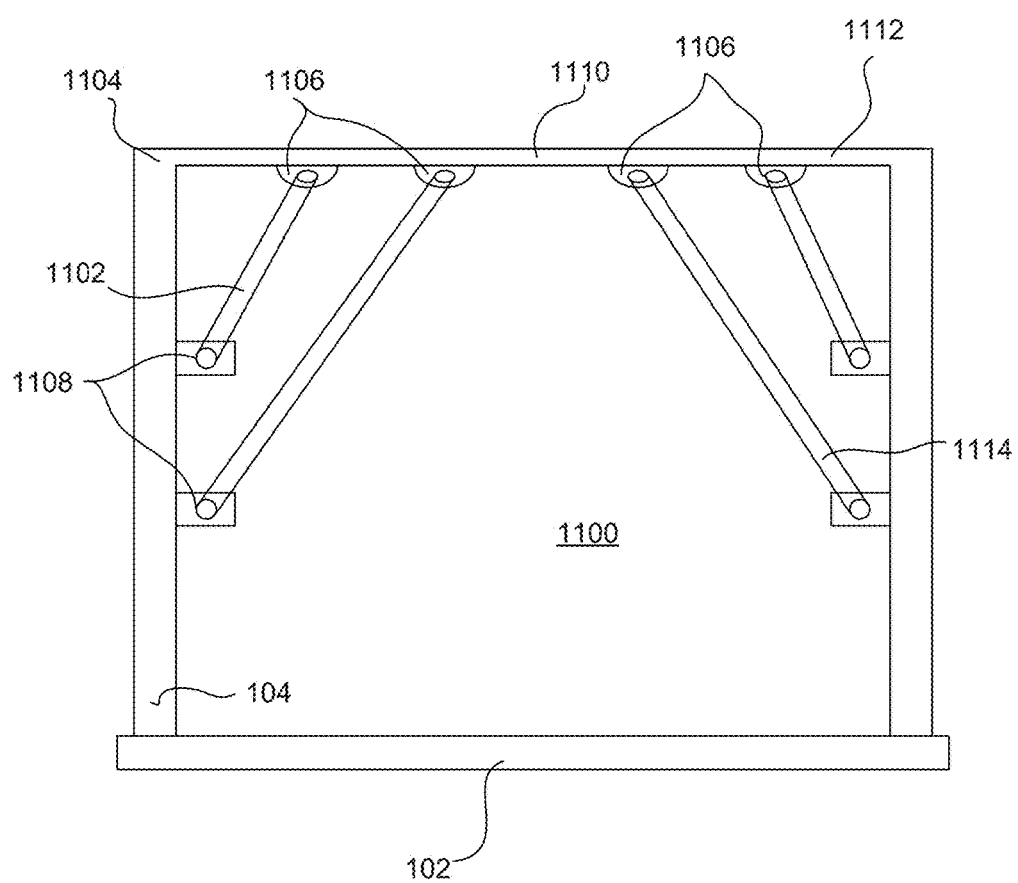
FIG. 11 is a front plan view of an uplift assembly.

Turning now to FIG. 11 shows an uplift assembly 1100 as viewed from the back of the trailer 102. A series of loops 1106 are on the horizontal surface of the frame 104 and a corresponding series of loops 1108 are on the vertical surface of the frame 104. A strap 1112 is coupled to each corner 1104 of the frame 104 and passes over the tarp 1110 and through the horizontal loops 1106 to the vertical loops 1108. The uplift may have a double configuration by using only two straps 1114 or may be a quad configuration with the addition of two more straps 1102. Tightening the straps 1102 and/or 1104 causes the tarp 1110 to stretch and prevents pleating.

Figure 12A:
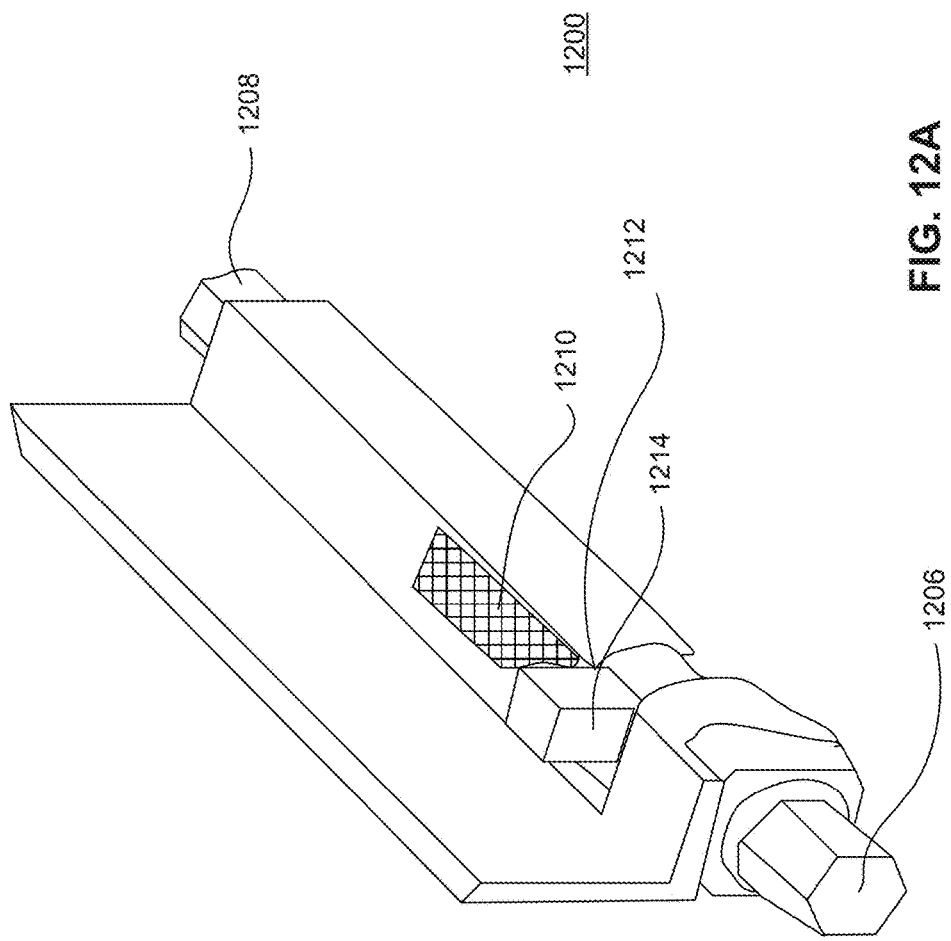
FIGS. 12A and 12B show perspective views of a pneumatically actuated barrel tensioner in a tensioning and releasing configuration respectively.
Figure 12B:
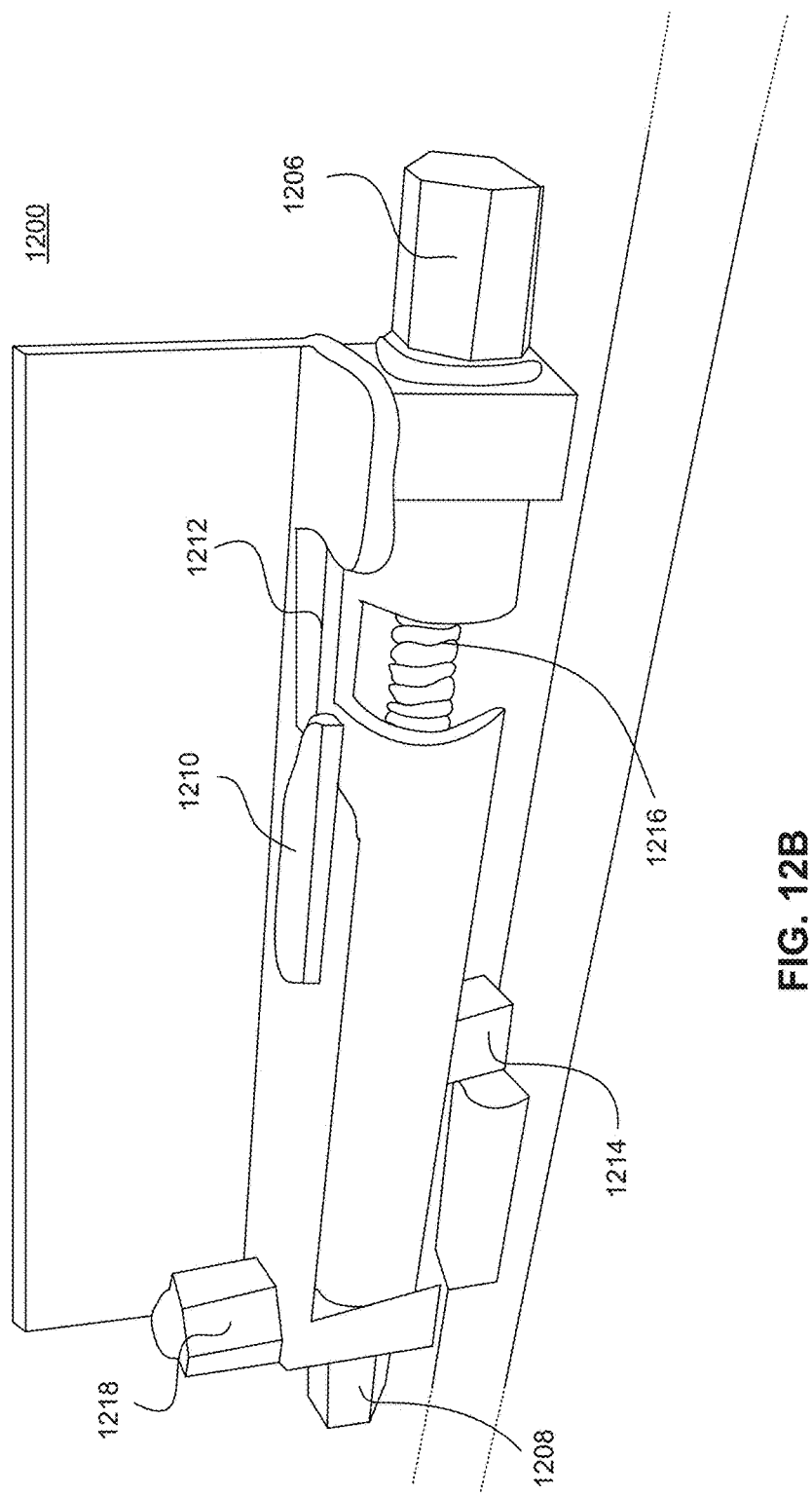

FIGS. 12A to 12B demonstrate a pneumatically actuated barrel tensioner 1200 adapted for remote actuation. As previously described with reference to FIGS. 7A and 7B, a button (not shown) may be placed on the headboard 112 whereby the button activates an air drive (not shown) mounted to one of a pair of tensioning bolts 1206, 1208 on the front or back side of the barrel tensioner 1200. An air assembly line (not shown) connected to the air drive actuates the barrel tensioner 1200 to tension or release the tarp. A tab 1210 on the upper section of the slot 1212 prevents the thrust nut 1214 from falling while the barrel tensioner 1200 is being actuated to tension the tarp. A tension spring 1216 is tightened when the air drive actuates the tensioning bolt 1206, 1208 to tension the tarp and the tension spring 1216 loosens when the air drive actuates the tensioning bolts 1206, 1208 to release the tarp. The vertical bolt 1218 allows storage of a crank handle (not shown).

Rather than a barrel tensioner 1200, a gear assembly 1300 shown in FIGS. 13A and 13B may be used. The gear assembly may be a pinion-bull gear 1304 may be mounted to a bracket 1308. An arm 1302 may turn the gear 1304 or a pneumatic actuator 1306 may actuate the gear 1304. An air inlet 1310 receives compressed air and a valve 1312 determines which direction the pneumatic actuator 1306 rotates its gear 1314. The actuator gear 1314 engages the main gear 1304 in order to release or tension the tarp. A puck 1316 is mounted and fixed to the rear frame where the tarp is connected. Arm 1302 is turned by exerting a force on the puck 1316 causing the frame to shift which tensions or loosens the tarp depending on the direction arm 1302 is turning.

Figure 14B:
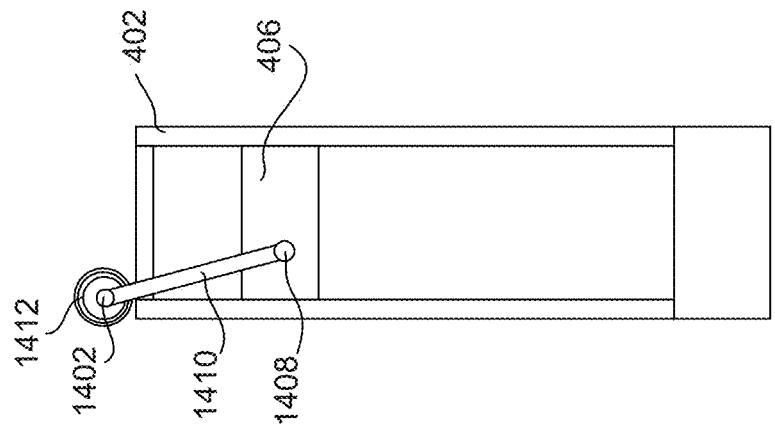
FIGS. 14A and 14B demonstrate a side plan view of a flap assembly in a closed and open position respectively.
Figure 14A:
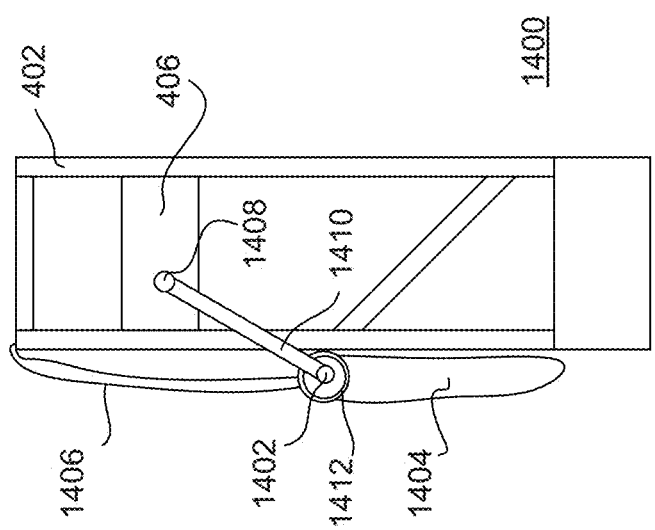

Turning now to FIGS. 14A and 14B, a rear flap assembly 1400 on a tarping system is shown having a lower portion 1404 and an upper portion 1406. FIG. 14A demonstrates the rear flap assembly 1400 in a closed position and FIG. 14B demonstrates it in an open position. The lower and upper portions 1404 and 1406 wrap around a pully 1402 having a coil spring therein (not shown). The pully 1402 is connected to a cross member 406 of the frame 402 by a lifting arm 1410 on each side of the pully 1402. The pully 1402 has a rope (not shown) allowing the user to retract or extract the flap by turning the pully 1402. As the pully 1402 is turned to retract the flap, the lift arm 1410 swivels upward as the upper portion 1406 wraps around the pully 1402. When the flap is fully extracted as shown in FIG. 14A, the lower portion 1404 may be coupled to the trailer using buttons, Velcro, etc.

In another example shown in FIGS. 15A and 15B, the corners and edges 1502 of the frame 402 may be sharp and cut the tarp when slid onto the frame 402. Inserts 1500 are provided for placement in the openings 1502 in order to protect the tarp from damage. The inserts 1500 are constructed of resilient plastic or rubber permitting placement of the tapered end 1504 into the opening 1502. A slot 1506 is present in order to permit insertion into different sized openings 1502. A tab 1508 is present allowing for easy removal from the opening 1502.

Figure 16:
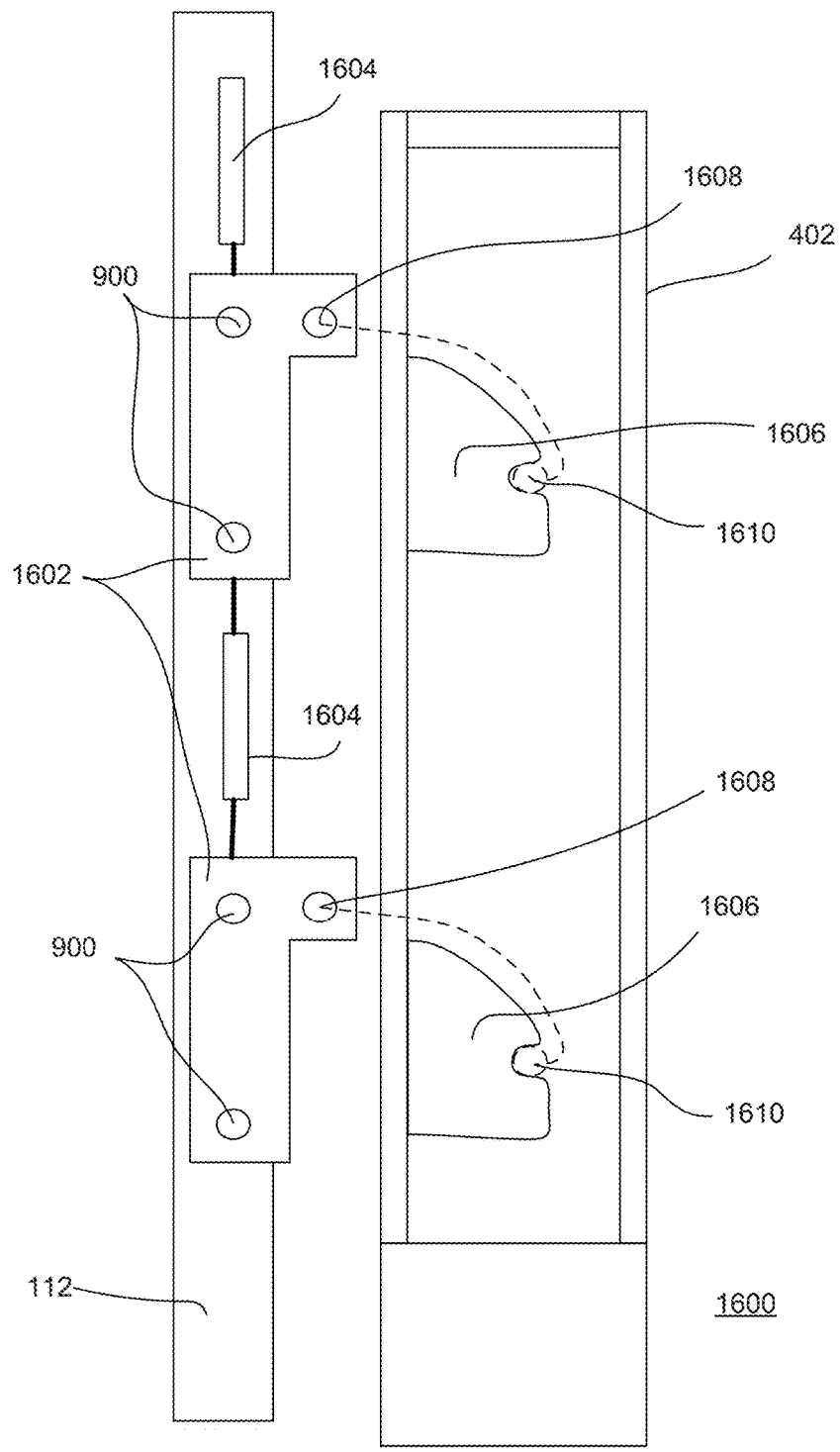
FIG. 16 demonstrates a side plan view of a headboard removal assembly of a tarp tensioning system.

As shown in FIG. 16, the front frame 402 may permit removal of the headboard 112 using a headboard removal assembly 1600. The headboard 112 is mounted to a set of plates 1602 by way of a track (now shown). Within the tracks are a plurality of wheels 900 (or optionally covered wheels 1000) mounted on the plates 1602. The tracks are shaped in such a way that keeps the wheels 900 in line. Air cylinders 1604 pushes the plates 1602 up and down. Since the wheels 900 are fixed on the plates 1602, wheels force the places to move on the tracks. The frame 402 has a set of locking plates 1606 that engage a pair of wheels 1608. The wheels 1608 roll along the locking plate until they engage corresponding locking notches 1610 that hold the headboard 112 in position.

Figure 17:
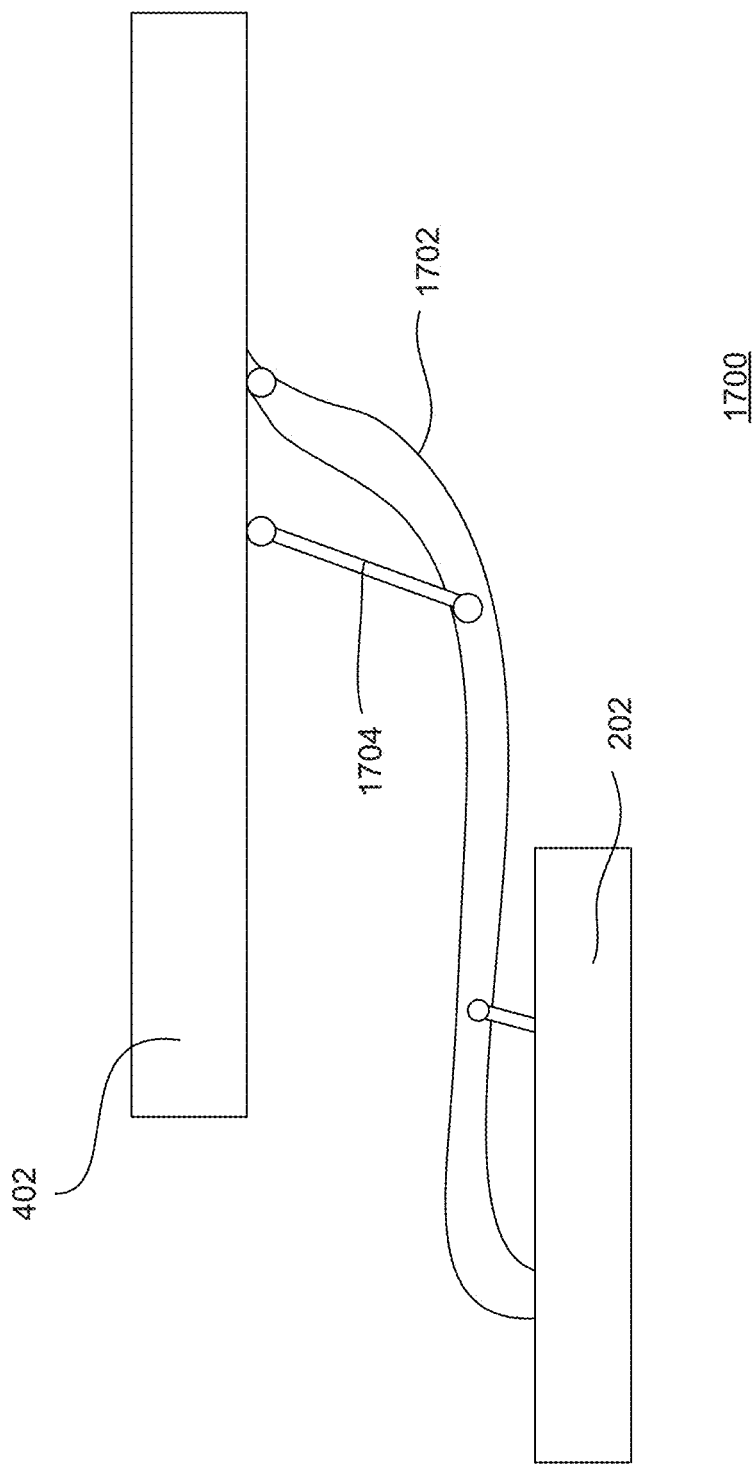
FIG. 17 shows a top plan view of a door hinge for a headboard of a tarp tensioning system.

FIG. 17 presents a top view of a door hinge assembly 1700. The door 202 is coupled to the frame 402 by way of one or more flexible cam arms 1702. Each cam arm 1702 is stabilized by one or more swivel links 1704. This permits the door 202 to slide laterally with respect to the headboard 112.

Figure 18:
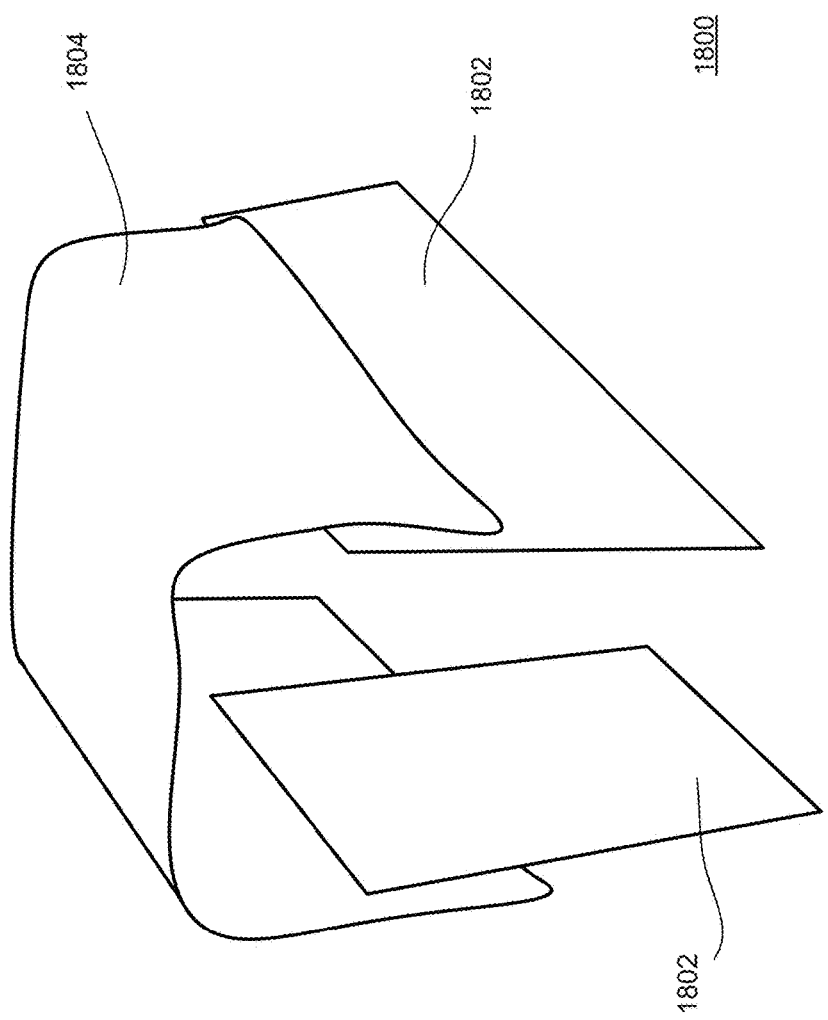
FIG. 18 presents a tarp system.

FIG. 18 presents a tarp system 1800 comprising two side sections 1802 overlapped by a top section 1804. The overlapping top section 1804 prevents water and dirt from entering the top. The independent sections 1802 permit replacement of a damaged side 1802 without requiring replacement of the other side section 1802 or the top section 1804.

Figure 19:
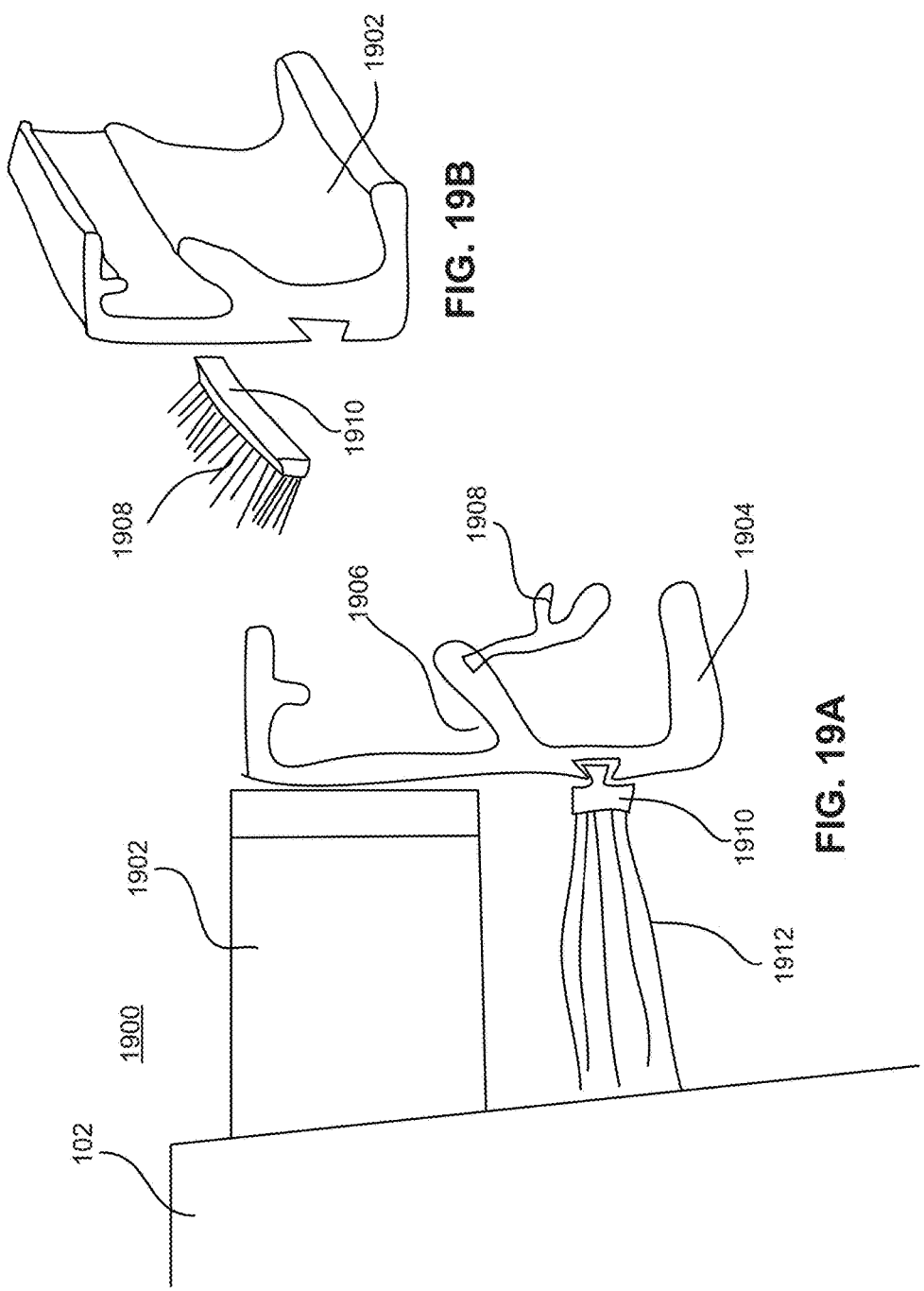
FIGS. 19A and 19B so a side view and a perspective view respectively of a sealing system for the tarp tensioning system.

FIGS. 19A and 19B show a sealing system 1900 for the tarp tensioning system 100. A stake pocket 1902 is coupled to the trailer 102 whereby the stake pocket 1902 is configured to receive a chain and tightening mechanism (not shown). A weather sealing bracket 1904 is coupled to the stake pocket 1902. The weather sealing bracket 1904 has a dirt catcher 1906 angled upward to prevent any dirt from reaching the stake pocket 1902 or entering the tarped area. A bristle pack 1910 may be coupled to the weather sealing bracket 1904 underneath the stake pocket. A double seal 1908 where the lower seal seals the bottom portion and the upper seal can be moved or lowered easier while the chain or strap is slid through. The bristle pack 1910 has a number of bristles 1912 that permit the fasteners (e.g. chains and/or straps) (not shown) to slide through. Once the fasteners are slid through, the bristles 1912 surround the fasteners by closing the open space created during strapping and tightening of the load. The bristles 1912 prevent dirt or water from entering the tarped area of the trailer 102.

Figure 20:
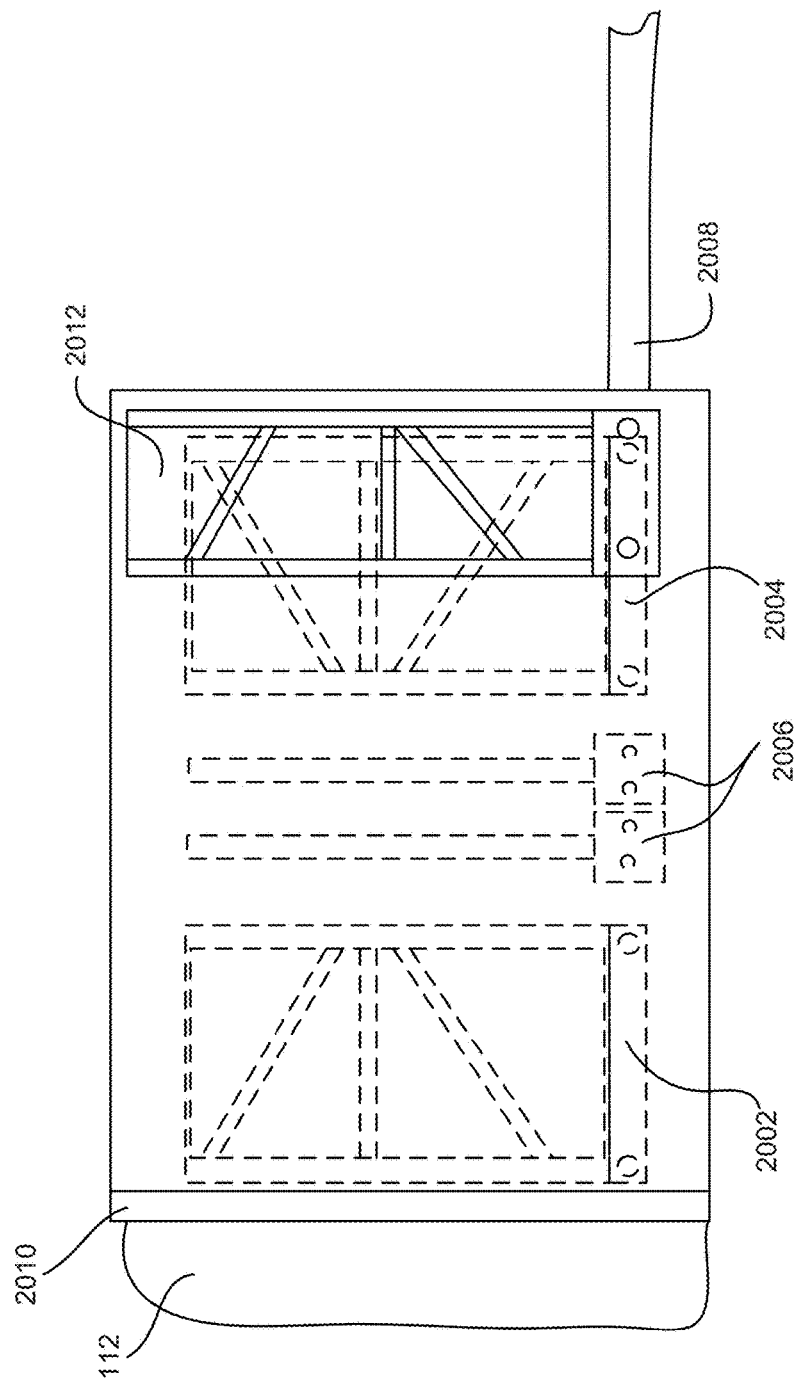
FIG. 20 show a side view of a wide load adaptation for the tarp tensioning system.

FIG. 20 shows a side view of the trailer 102 hauling a wide load (e.g. wider than 102"). The conventional tarp system is shown in dotted line profile and comprises a front frame 2002 and read frame 2004 rolling or gliding in a track 2008. One or more middle frames 2006 are also presented. When a wide load is required, the conventional tarp system is rolled forward or behind the portion of the trailer where the wide load is to be placed. A wider frame 2010 is coupled to the headboard 112 and a widened rear frame 2012 is rolled into the track 2008. The smaller conventional tarp system is then covered by the widened tarp system.

Figure 21B:
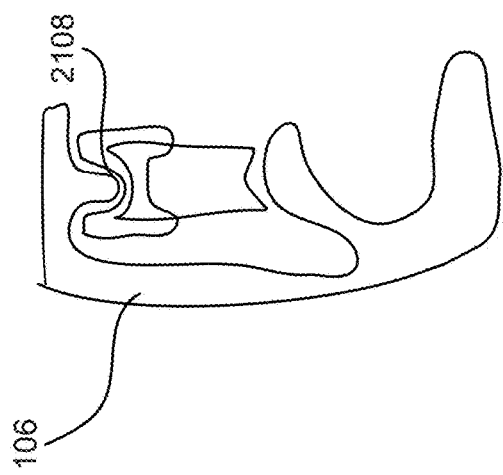
FIGS. 21A and 21B demonstrate a bumper system for the frame of the tarp tensioning system.
Figure 21A:
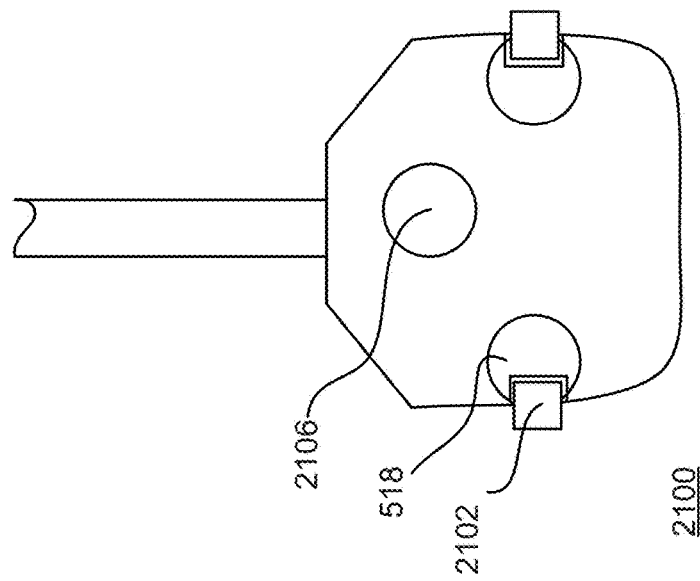

FIGS. 21A and 21B demonstrates a bumper system 2100 for the frame 104. At the base of the frame 104, where the wheels 518 roll in tracks 106, a slot is cut which accepts a rubber bumper 2102 aligned with the wheels 518. When the frames 104 are pushed toward the rear or front of the tracks 106, the rubber bumpers 2102 contact each other and present noise and/or damage when the frames meet. The rubber bumper 2102 protrudes from the slot a sufficient amount to absorb the energy of the frame 104 moving in the tracks 106. An additional top wheel 2106 is added that runs in an additional track 2108 that provides stability to the frame 104 during motion and reduces the likelihood that the frame 104 may tip.

Figure 22:
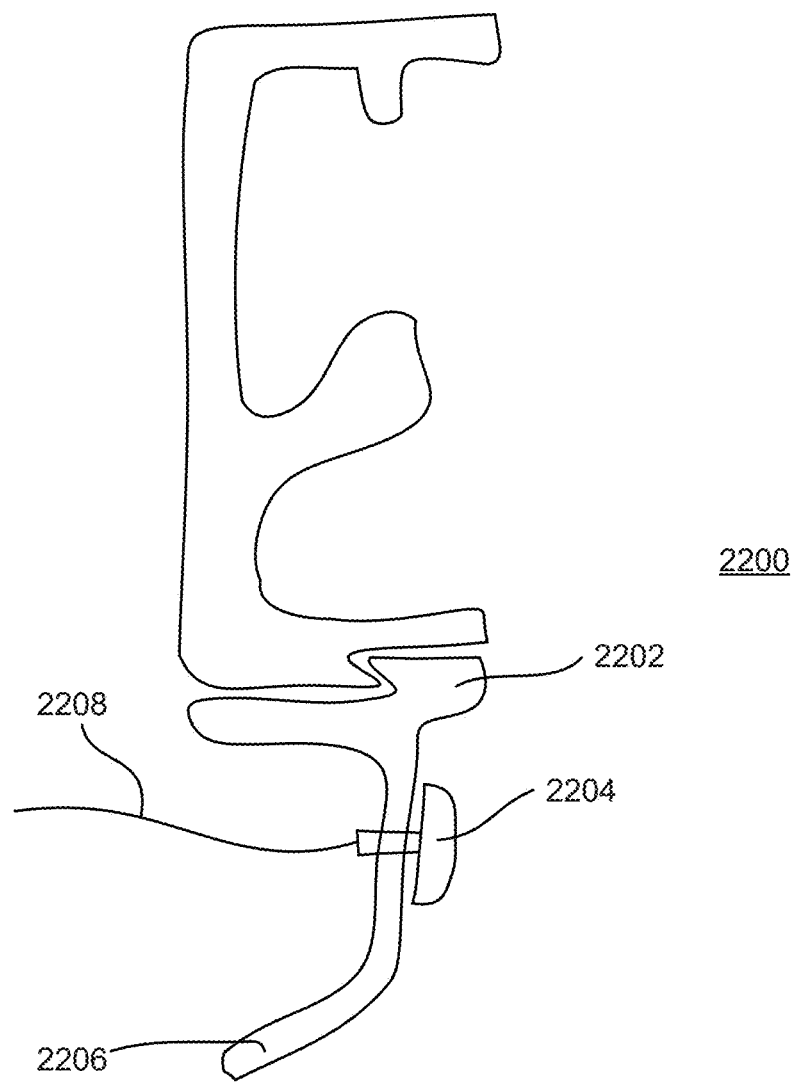
FIG. 22 shows a light bar system for mounting lights below the tarp tensioning system.

FIG. 22 shows a light bar system 2200 for mounting below the track 106. When a tarping system 100 is placed on a trailer 102, the tarping system 100 frequently blocks the lights on the trailer 102. Existing methods have involved welding light bars below the tracks 106 and are difficult to mount or once mounted, to change the bulbs. The light bar system comprises a support structure 2202 for supporting a light 2204 mounted thereto. The support structure 2202 sloped downward 2206 in order to prevent dirt and debris from damaging the light 2204 or the electrical and control cables 2208. Behind the light 2204 is an open area which allows easy access to the light 2204 for installation or changing of the bulb (not shown). The support structure 2202 may be mounted either in sections along the length of the trailer or be full length.

The above-described embodiments are intended to be examples of the present invention and alterations and modifications may be effected thereto, by those of skill in the art, without departing from the scope of the invention, which is defined solely by the claims appended hereto.

What is claimed is:

1. A system for tarping a trailer having a front and a back, comprising:
   a plurality of frames having at least three bow members and a biasing mechanism coupled between at least two of the bow members;
   a plurality of cross members interconnecting at least two of the bow members not coupled together with the biasing mechanism; and
   at least one wheel mounted at a base of the frame to be received into at least one track on either side of the trailer.

2. A system for tarping a trailer having a front and a back, comprising:
   a plurality of frames having at least two bow members and a biasing mechanism coupled therebetween;
   at least one wheel mounted at a base of the frame to be received into at least one track on either side of the trailer;
   a pair of channels coupled to each side of the frame;
   a pair of slide assemblies having a slide wheel at one end engaged within the respective channel; and a pair of connector blocks coupling the ends of the slide assembly opposite the slide wheel to the respective track of the trailer.

3. A system for tarping a trailer having a front and a back, comprising:
- a plurality of frames having at least two bow members and a biasing mechanism coupled therebetween;
- a remotely actuated tensioning and release device coupled between the trailer and the frame located at a back of the trailer; and
- at least one wheel mounted at a base of the frame to be received into at least one track on either side of the trailer.

4. The system according to claim 3, wherein the remotely actuated tensioning and release device comprises at least one of a pneumatic cylinder, a pneumatic barrel tensioner, gear assembly, a hydraulic cylinder, and any combination thereof.

5. The system according to claim 3, wherein the remotely actuated tensioning and release device is controlled by a controller located proximate the front of the trailer.

6. A system for tarping a trailer having a front and a back, comprising:
- a plurality of frames having at least two bow members and a biasing mechanism coupled therebetween;
- at least one wheel mounted at a base of the frame to be received into at least one track on either side of the trailer; and
- at least one hinge rotating the track horizontally with respect to the trailer.

7. The system according to claim 6, further comprising an actuator rotating the at least one hinge.

8. The system according to claim 6, the frame further comprising two frame portions coupled together with at least one frame expanding actuator to increase a horizontal distance between the two frame portions.

9. A system for tarping a trailer having a front and a back, comprising:
- a plurality of frames having at least two bow members and a biasing mechanism coupled therebetween;
- at least one wheel mounted at a base of the frame to be received into at least one track on either side of the trailer;
- an aerodynamic headboard located at a front of the trailer; and
- at least one pneumatic cylinder coupled to the aerodynamic headboard and the trailer reducing angular motion of the aerodynamic headboard.

* * * * *